June 30, 1970

3,518,697

MATERIAL TESTER AND RECORDER

Filed Dec. 18, 1967

INVENTOR:
George D. Martens

ATTORNEY

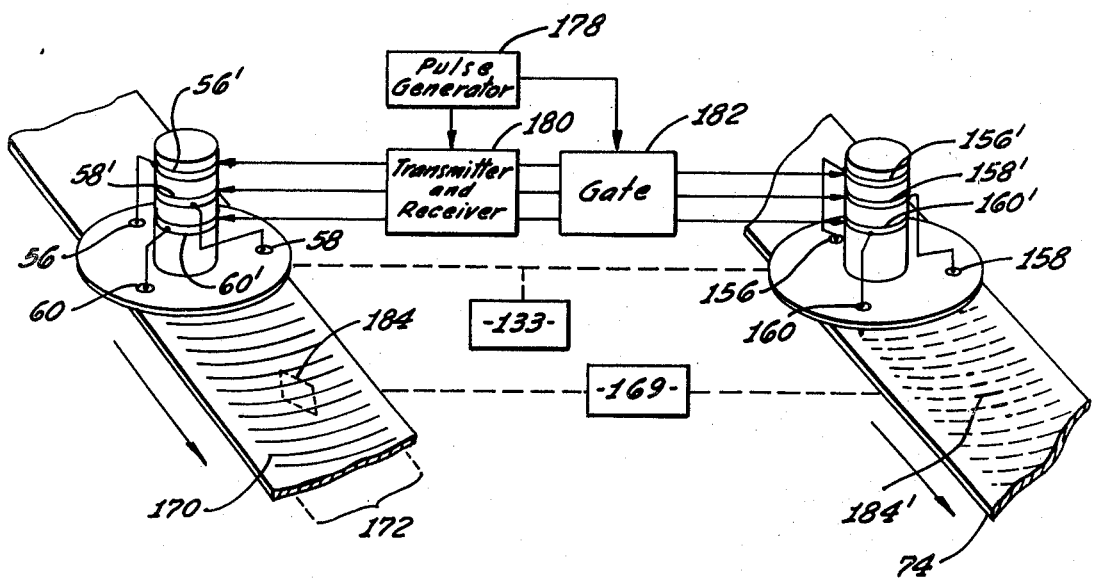
Fig. 3
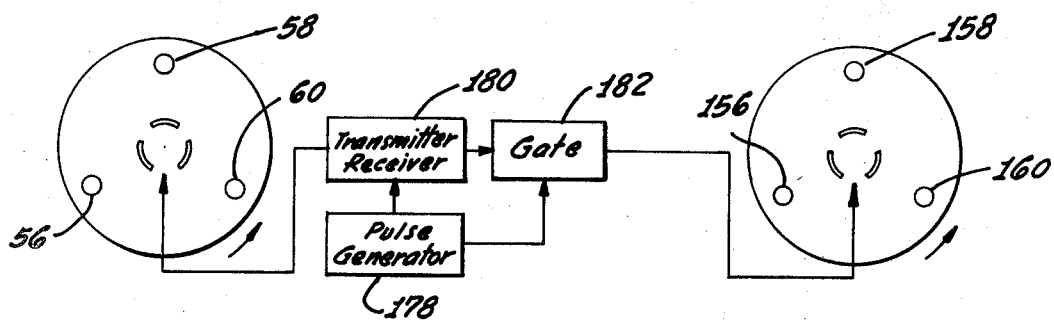
Fig. 4
INVENTOR:
George D. Martens
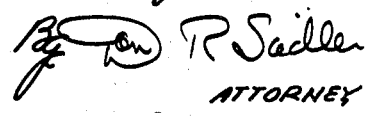
ATTORNEY

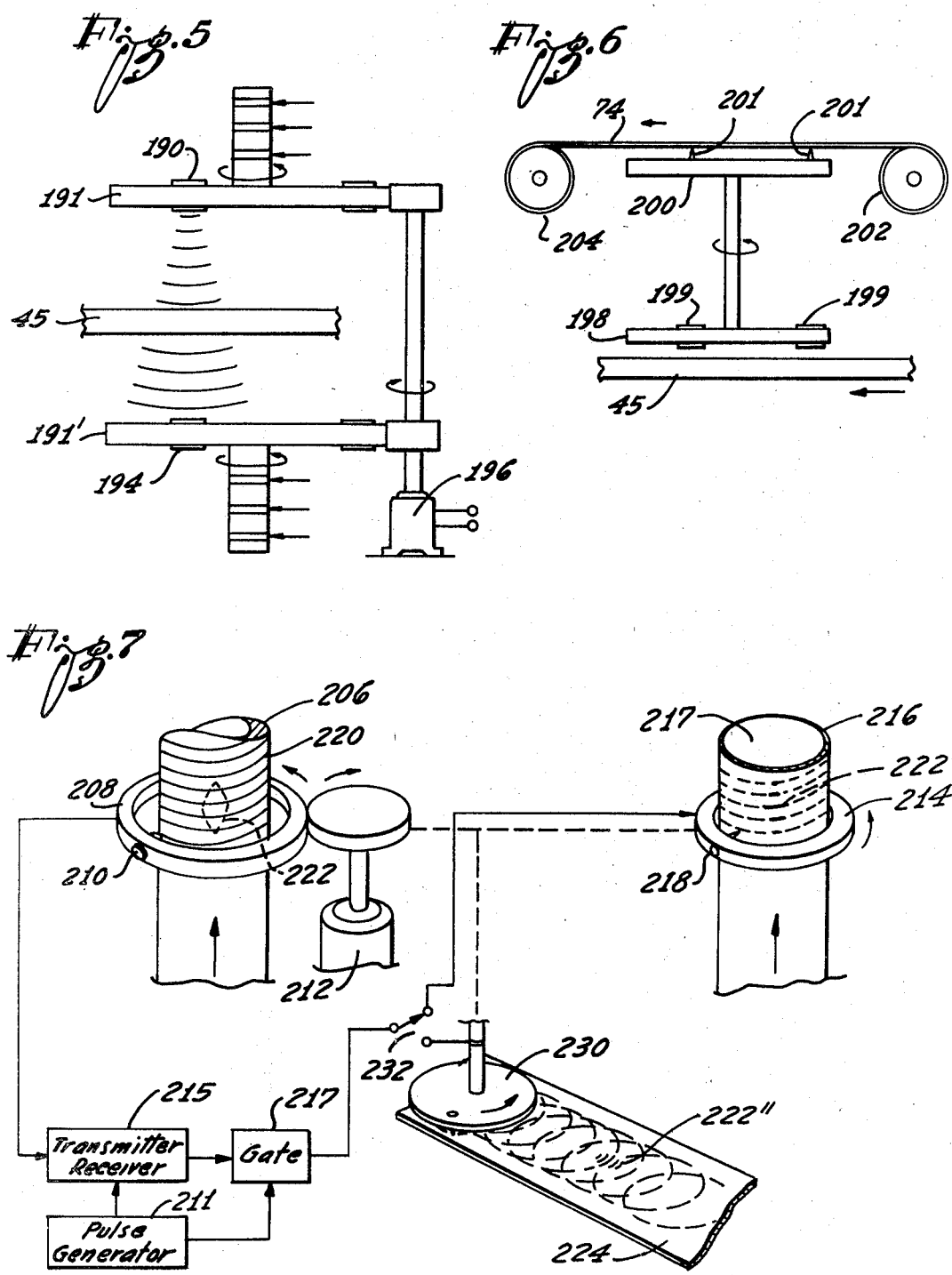

United States Patent Office 3,518,697
Patented June 30, 1970

3,518,697
MATERIAL TESTER AND RECORDER
George D. Martens, Brookfield Center, Conn., assignor to Automation Industries, Inc., El Segundo, Calif., a corporation of California
Filed Dec. 18, 1967, Ser. No. 691,497
Int. Cl. G01n 23/18, 29/04
U.S. Cl. 346—33                                    1 Claim

ABSTRACT OF THE DISCLOSURE

This application discloses a nondestructive material tester for producing a so-called C-scan recording of the test results. The test system includes a search unit having rotating transducers which scan the workpiece along a series of closely spaced arcuate paths whereby a wide band on the workpiece may be inspected. A recorder includes markers such as pens which scan along similar arcuate paths. The search unit and the recorder are synchronized whereby the test results may be recorded in a one-to-one relation with the workpiece so as to provide an undistorted recording.

BACKGROUND OF THE INVENTION

Field of the invention

This invention relates generally to systems for nondestructively testing or examining materials and structures and more particularly to apparatus for such testing which utilizes acoustic, X-ray or other energy for probing the material to be examined.

Although the present invention is particularly useful in the field of acoustical testing and although in the cause of clarity and brevity much of the following discussion and description of examples of the invention relate particularly to such utilizations, it is expressly to be understood the advantages of the invention are equally well manifest in other types of testing such as, for example, by techniques which include irradiation of the material by optical, X-ray or other electromagnetic energy.

Discussion of the prior art

In recent years the field of nondestructive testing or inspecting of solid materials and structures has developed rapidly. The general advantages of such techniques are well known and include the capability of testing structural materials and finished devices for visually hidden flaws thereby improving the suitability and reliability of such materials and devices for predetermined applications as well as to permit their safe design for critical utilizations with a much lower safety factor. For example, knowing in advance that a part is machined from a homogeneous or "perfect" casting may permit the designer to specify thinner wall thicknesses and the like thereby reducing the weight of the finished part, increasing its reliability and other performance characteristics and, for some utilizations, causing an otherwise impractical device to be completely practical and feasible.

Examples of such visually hidden flaws include internal fissures, voids, foreign bodies, variations in density, porosity and other discontinuities. Such discontinuities tend to reflect and/or absorb energy in different ways from the surrounding material. It is practical to probe for such flaws with acoustical or other energy. The energy which is returned from, or transmitted through, the workpiece may be analyzed to provide information as to the existence, disposition and nature of any such flaws.

When inspecting a workpiece with ultrasonic or acoustical energy it is customary to scan the workpiece with a search unit which transmits acoustical energy into the workpiece and receives such energy after it has traveled through at least a portion of the workpiece. Normally the search unit has traveled in a rectilinear search pattern whereby the entire workpiece is progressively inspected in a systematic manner. When it is desired to provide a permanent record of the inspection a suitable recorder, such as a strip chart recorder may be operatively coupled to the test equipment utilized with the search unit. The recorder includes a pen or other form of marker which is adapted to move over the recording medium, such as a paper, in a scan pattern. The marker has heretofore traveled in straight lines over the paper in a rectilinear pattern similar to that followed by the search unit scanning over the surface of the workpiece and the characteristics of the flaw may be readily determined from a visual examination of the recording.

The search unit preferably travels in a systematic pattern to minimize the probability of non-detection of flaws. A reciprocating scan pattern along closely spaced lines provides a raster of traces. Commercially available recorders have a similar rectilinear scanning pattern whereby they can be readily synchronized with the movement of the search unit. With the development of nondestructive testing, the demand has grown for faster, more reliable and more efficient testing systems. Reciprocating carriage mechanisms for the search units are inherently limited in speed and subject to much wear and other mechanical difficulties. Furthermore, they suffer from backlash and hysteresis effects.

Many of these disadvantages or limitations have been cured by the development of a search unit employing a rotating structure having one or more transducers which scan the workpiece in a series of closely spaced arcuate paths. A nondestructive testing system utilizing a search unit of this variety is disclosed and claimed in Ser. No. 578,760, filed in the name of Richard Y. Neiley, entitled Material Tester and assigned of record to Automation Industries, Inc. In such a search unit one or more transducers are carried by a rotating structure such as a turntable which revolves at a constant angular velocity while it advances along the workpiece. The transducers travel along arcuate paths at closely spaced intervals whereby they inspect a strip or band having a width approximating the diameters of the circles swept by the transducers. This permits high speed, non-reciprocal, systematic scanning of the workpiece. Although this form of circular scanning has many advantages, when using a recorder having a pen traveling in a straight line there is a distortion in the recording presentation. Although the recordings do indicate the presence of flaws, etc., the distortions are intolerable where a precise determination must be made as to the size, shape, etc. of the flaw. In addition, rectilinear recorders also suffer wear and tear, maintenance and reliability problems, inaccuracies due to backlash, and relatively high cost and low efficiency.

SUMMARY OF THE INVENTION

The embodiments of the invention disclosed herein include a search unit having a rotary yoke or turntable carrying one or more transducers which sweep over the workpiece as the turntable advances along the workpiece. The transducers sweep out a series of arcuate paths whereby a relatively wide band is inspected each time; the search unit travels along the surface of the workpiece.

A recorder having a similar rotary yoke or turntable carrying an array of recording heads or pens are coupled to the search unit. These are arranged similar to the transducers and are rotated and translated over the recording medium in synchronism therewith. Since the transducers and recording heads move in identical manner and are synchronized with each other the resultant record is spatially correlated with the geometric parameters of the workpiece and has an obvious visual resemblance to the workpiece and its internal characteristics.

Further details of these and other novel features and the operation of the invention, as well as additional objects and advantages thereof, will become apparent and be best understood from a consideration of the following description when taken in connection with the accompanying drawings which are presented by way of illustrative example only.

BRIEF DESCRIPTION OF THE DRAWINGS

FIG. 3 is a combination perspective view and block diagram of the nondestructive tester, FIG. 4 is a combination schematic and block diagram illustrating certain structural and electrical relationships of the combination;

FIG. 5 is a side view of a portion of a different embodiment of the invention;

FIG. 6 is a similar side view of another embodiment of the invention; and

FIG. 7 is a simplified perspective view of certain portions of another embodiment of the invention.

DESCRIPTION OF THE PREFERRED EMBODIMENTS

With specific reference now to the figures in detail, it is stressed that the particulars shown are by way of example and for purposes of illustrative discussion only and are presented in the cause of providing what is believed to be the most useful and readily understood description of the principles and structural concepts of the invention. In this regard, no attempt is made to show details of structural or functional relationships in more detail than is necessary for a fundamental understanding of the invention. The description taken with the drawings will make it apparent to those skilled in the mechanical and materials testing arts how the several forms of the invention may be embodied in practice. Specifically, the detailed showing is not to be taken as a limitation upon the scope of the invention which is defined by the appended claims forming, along with the drawings, a part of this specification.

Figure 1:
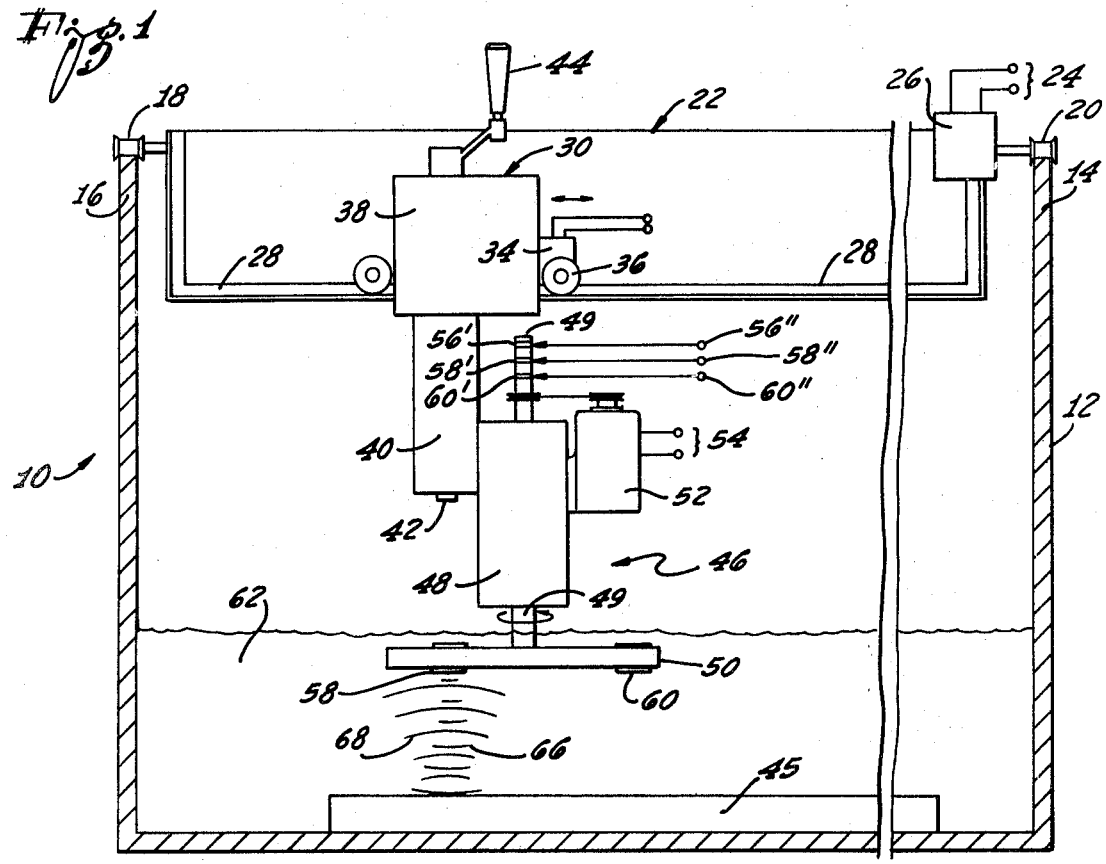
FIG. 1 is a view of a portion of an ultrasonic nondestructive test system embodying one form of the present invention.

An inspection apparatus or material tester 10 embodying one form of the invention is shown in FIG. 1. This embodiment includes a tank 12 having a pair of supporting rails 14 and 16 along the opposite sides thereof. A carriage support 22 is carried by roller members 18 and 20 which travel on the rails 14 and 16. The carriage support 22 is driven along the length of the rails 14 and 16 by a reversivle drive motor 26 energized through the leads 24.

The carriage support 22 includes a transverse supporting track or rail 28. A test carriage 30 travels along the rail 28. The carriage 30 is propelled by a reversible drive motor 34 connected to the roller 36. A support body 38 is mounted on the test carriage 30 and carries a lower support frame 40 which projects downward therefrom. A vertical lead screw 42 is disposed inside the frame 40 and is operated by a control handle 44.

A test assembly 46 is supported by the frame 40 and is coupled to the lead screw 42. By rotating the crank 44 the test assembly 46 may be raised or lowered relative to the workpiece 45. A housing 48 is mounted upon the frame 40 and supports the drive shaft 49 carrying a rotatable yoke or turntable 50. The shaft 49 and turntable 50 are connected to a drive motor 52 by a belt drive. The motor 52 is energized through a set of leads 54.

Transducers are mounted on the turntable 50. Although any number may be used in the present instance there are three transducers 56, 58 and 60 equally spaced about the axis of the shaft 49. Each of the transducers 56, 58 and 60 are electrically coupled to slip rings 56', 58', and 60' on the end of the shaft 49. Brushes ride on the slip rings 56', 58' and 60' and are effective to couple the transducers to external circuitry through a set of leads 56", 58" and 60". If desired the slip rings 56', 58' and 60' and brushes may be arranged such that the transducers 56, 58 and 60 are operative over only a limited arc of the rotation.

The workpiece 45, turntable 50 and the transducers 56, 58 and 60 may be immersed in a liquid environment 62 contained by the tank 12. The liquid 62 is transparent to ultrasonic energy and is effective to acoustically couple the transducers 56, 58 and 60 to the workpiece 45.

The transducers 56, 58 and 60 are coupled via the slip rings 56', 58' and 60', the brushes and leads 56", 58" and 60" to an electronic system which is best seen in FIGS. 3 and 4. This system includes a transmitter-receiver 180. A pulse generator 178 is coupled to the transmitter 180 and is effective to periodically trigger the transmitter 180. The transmitter 180 in turn causes driving pulses to be coupled via the slip rings 56', 58' and 60' to the transducers 56, 58 and 60 whereby they radiate or transmit pulses of ultrasonic energy along the beam 66. The ultrasonic energy is reflected from the workpiece and discontinuities inside the workpiece back along a path 68.

Any echoes of these pulses reflected back toward the turntable 50 are received by the transducers 56, 58 and 60 which are effective to produce electrical signals corresponding to the returning echoes. These signals are received or detected by the receiver 180. The times between the transmission of the initial pulses and the returning echoes are functions of the distances to the reflecting surfaces. Accordingly, by measuring the time to receive the returning echo it is possible to determine the range to the reflector.

As the turntable 50 rotates the motors 26 and/or 34 cause the housing 48 to travel along the workpiece 45. The transducers 56, 58 and 60 will thereby travel along a series of closely spaced arcuate paths 170. It will be seen this allows a wide band 172 of the workpiece 45 to be inspected during a single pass. As best seen in FIG. 4, the brushes and slip rings 56', 58' and 60' are normally arranged to energize the transducers only while they are moving across the leading edge. This eliminates a complex spiral scanning pattern and over inspecting.

A gate 182 may be coupled to the receiver 180 and controlled by timing pulses from the pulse generator 178. This gate 182 normally remains closed whereby no signals pass therethrough. The gate 182 opens in response to the time pulses from the pulse generator 178 for an interval which corresponds to the range which is of interest. For example, it may open just after the echo from the entrant surface of the workpiece 45 and close just before the echo from the back surface. As a result only echoes that originate inside of the workpiece 45 will be passed.

If the workpiece 45 is free from any internal discontinuities, there will be no echo signals occurring during the interval when the gate 182 is open. However, if there is a discontinuity, such as at 184, there will be echo signals during the open interval. As a consequence each time a transducer 56, 58 and 60 passes over a discontinuity a signal will occur at the output of the gate 182.

Figure 2:
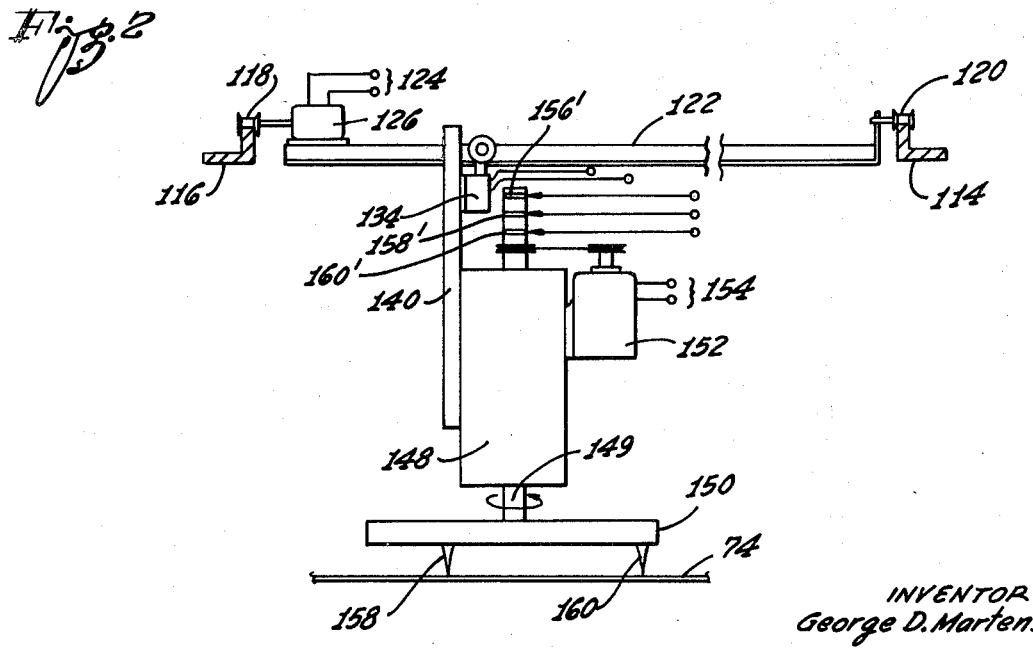
FIG. 2 is a view of a recorder used in connection with the system of FIG. 1.

The output from the gate 182 is coupled to a recorder for making a permanent record of the test results. Although the recorder may be in a wide variety of different forms, in the present instance it is best seen in FIG. 2. This recorder includes many parts which are similar to those in the tester and these similar parts have the same reference numerals increased by 100.

The recorder includes a pair of tracks 114 and 116, a carriage support 122 includes wheels 118 and 120 which travel on these tracks. A frame 140 is carried by the carriage support 122 and travels thereacross. Motors 126 and 134 are effective to move the frame 140 in the same manner as the frame 40. The leads 24 and 124 and the leads 32 and 132 are preferably joined whereby the two motions are synchronized from a common signal source 133.

A housing 148 is mounted on the frame 140 and carries a vertical shaft 149 and a motor 152. The motor 152 is mechanically connected to the shaft 149 by a belt drive and is electrically connected to the motor 52 by the leads 154. Slip rings 156', 158' and 160' are connected to leads 156", 158" and 160" which lead to the output of the gate 182.

A yoke or turntable 150 is provided on the lower end of the shaft 149. It can be appreciated the yoke or turntable 150 will follow the same pattern of motion as the yoke or turntable 50 and that they will be fully synchronized with each other.

Markers 156, 158 and 160 are carried by the turntable 150 for marking on a strip of recording material 74. The markers 156, 158 and 160 are arranged in the same configuration as the transducers 56, 58 and 60. These may be pens for marking on plain paper or discharge electrodes for marking on electrostatic paper, etc.

By referring to the block diagrams in FIGS. 3 and 4 it can be seen the transducers 56, 58 and 60 and markers 156, 158 and 160 all rotate in synchronism with each other. If the advance of the paper 74 is synchronism with the workpiece 45 by the drive 169, the markers 156, 158 and 160 will synchronously duplicate the motor of the transducers 56, 58 and 60. As the transducers travel along the arcuate paths 170 they inspect the interior of the workpiece 45. If there are no internal discontinuities there will be no signals from the gate 182. As a result there will be no markings on paper tape 74.

However, if there is a discontinuity 184 inside of the workpiece, there will be signals coupled from the gate 182 to the markers 156, 158 and 160. This will cause a pattern 184' to be drawn on the paper 74. Since the motion of all of the markers is synchronized with the motion of the transducers, the shape, size, etc. of the recorded pattern will be in scale to the discontinuity. In fact, if the markers 156, 158 and 160 sweep the same diameter as the transducers 56, 58 and 60, a 1-to-1 recording will be provided. This recording can then be laid directly over the workpiece for a direct comparison.

Referring to FIG. 5, the example of the invention illustrated is of the character to transmit ultrasonic energy from the transmitting transducers 190 through the workpiece 45 to a receiving transducer 194. These transducers are carried on the opposite sides of the workpiece by turntables 191 and 191'. The turntables 191 and 191' are driven synchronously by a motor 196. The transducers 190 and 194 may be coupled to a system and recorder substantially the same as described above.

In FIG. 6 an example of the invention is schematically illustrated in which the transducers 199 are mounted on a turntable or yoke 198 for scanning the workpiece. The markers 201 are mounted on a turntable or yoke 200 whereby, with a minimum of mechanical complexity, the workpiece 45 may be tested and the corresponding record thereof made on the recording sheet 74.

The motion of the recording paper and workpiece with respect to the yoke axis is made equal by causing the travel of the workpiece to coincide with the drive of the recorder paper from its supply spool 202 to its takeup spool 204. Again the function of the transducer and recorder head elements and the signal conditioning may be essentially similar to the operations discussed above.

Referring to FIG. 7, the example illustrated is characterized by being particularly applicable to inspection of cylindrical stock, such as pipe 206. In this embodiment the transducers 210 are carried on a toroidal yoke 208 which encircles the pipe 206 substantially concentric therewith. The yoke 208 is rotated about the pipe by a drive motor 212. A second similar toroidal yoke 214 is disposed circumferentially about a cylindrical recording paper body 216. This may be a flat strip of paper wrapped around a cylindrical mandrel. The two yokes 208 and 214 are driven synchronously. The transducer 210 is coupled to the marker 218 by a system having a pulse generator 211, transmitter-receiver 215, gate 217, etc. similar to the preceding embodiment.

In operation, the transducer 210 follows the spiral trace lines 220 on the workpiece 206 while the marker follows similar lines 220' on the recorder paper 216. A discontinuity at 222 is similarly reproduced at 222' on the cylindrcial paper as shown. The paper 216 with the recordings thereon may be removed from the mandrel and wrapped around the pipe 206 so as to indicate location of the defects.

In addition, or as an alternative, the switch 232 may be coupled to markers on a rotating turntable 230 so as to make recordings 222" on a flat strip of paper 224.

While only a limited number of embodiments of the present invention have been disclosed herein it will be readily apparent to persons skilled in the art that numerous changes and modifications may be made thereto without departing from the scope of the invention.

I claim:

1. A material tester for nondestructively inspecting a workpiece, said tester including the combination of means for supporting said workpiece to be tested by irradiation of one or more of its surfaces with energy of the character to penetrate such surfaces and re-emerge from said workpiece in signal form with characteristics indicative of the nature and structure thereof, first rotatable yoke means having an axis and adapted to be disposed contiguously to said workpiece and being of the character to be movable in predetermined systematic motion with respect thereto, transducer means carried by said first yoke means at a distance from its said axis for irradiatiing said workpiece with said penetrating energy and for receiving the re-emergent signals of said energy, transmitter means coupled to said transducer means for generating said energy, receiver means coupled to said transducer means for receiving said re-emergent energy signals therefrom and signal conditioning them for a predetermined form of presentation, recorder apparatus having a recording medium and including, second rotatable yoke means adapted to be disposed contiguously to said reording medium, recording head means coupled to said receiver means and carried by said second yoke means in signal presentation relation with said recording medium and being of the character to be movable with respect thereto, rotary drive means coupled to said first and second rotatable yoke means for rotating each thereof in a predetermined synchronous and systematic motion with respect to said workpiece and said recording medium respectively, and said axis of said first rotatable yoke is such that said irradiating energy is at a predetermined angle to the entrant surface of said workpiece, and said rotary drive means includes lateral drive means for translating said axes in predetermined systematic patterns of motion over their respective entrant and recording medium surfaces in a time spatially synchronous manner, said first and second rotatable yoke means comprises common shaft means whereby said axes are colinear.

References Cited

UNITED STATES PATENTS

| 2,740,289 | 4/1956 | Valkenburg et al. | 73—67.9 |
| 2,748,290 | 5/1956 | Reichertz | 250—83.3 |
| 2,770,966 | 11/1956 | Halliday et al. | 73—67.9 |
| 2,922,887 | 1/1960 | Jacobs | 250—83.3 |
| 3,064,077 | 11/1962 | Cary | 178—6.6 |
| 3,121,855 | 2/1964 | Thiede | 346—33 X |
| 3,166,930 | 1/1965 | Zollmer | 73—67.7 |
| 3,431,774 | 3/1969 | Dory | 73—67.8 |

FOREIGN PATENTS

| 1,046,774 | 10/1966 | Great Britain. |
| 1,210,801 | 10/1959 | France. |

JOSEPH W. HARTARY, Primary Examiner

U.S. Cl. X.R.

73—67.8; 250—52, 71.5